(12) United States Patent
Adomeit

(10) Patent No.: US 6,460,881 B1
(45) Date of Patent: Oct. 8, 2002

(54) AIRBAG SYSTEM

(75) Inventor: Heinz-Dieter Adomeit, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/424,888

(22) PCT Filed: May 26, 1998

(86) PCT No.: PCT/DE98/01485

§ 371 (c)(1), (2), (4) Date: Nov. 29, 1999

(87) PCT Pub. No.: WO98/55344

PCT Pub. Date: Dec. 10, 1998

(30) Foreign Application Priority Data

Jun. 2, 1997 (DE) .......................... 197 24 191

(51) Int. Cl.[7] .............................................. B60R 21/18
(52) U.S. Cl. ................. 280/733; 280/730.1; 280/730.2; 280/737
(58) Field of Search ............................ 280/733, 730.1, 280/730.2, 737, 749

(56) References Cited

U.S. PATENT DOCUMENTS

| 5,161,821 A | | 11/1992 | Curtis ........................ 280/730 |
| 5,288,104 A | * | 2/1994 | Chen ......................... 280/733 |
| 5,333,902 A | | 8/1994 | Hatfield ...................... 280/733 |
| 5,346,250 A | | 9/1994 | Kamiyama ................... 280/733 |
| 5,462,308 A | | 10/1995 | Seki et al. .................... 280/749 |
| 5,588,672 A | | 12/1996 | Karlow et al. ............. 280/730.2 |
| 5,642,902 A | * | 7/1997 | France ......................... 280/737 |
| 5,660,414 A | * | 8/1997 | Karlow et al. ............... 280/749 |
| 5,863,065 A | * | 1/1999 | Boydston et al. ............ 280/733 |
| 5,924,723 A | * | 7/1999 | Brantman et al. ........ 280/730.2 |
| 6,010,149 A | * | 1/2000 | Riedel et al. ............. 280/730.2 |
| 6,065,772 A | * | 5/2000 | Yamamoto et al. ...... 280/730.2 |
| 6,135,497 A | * | 10/2000 | Sutherland et al. .......... 280/749 |

FOREIGN PATENT DOCUMENTS

| DE | 42 32 041 | 4/1993 |
| DE | 43 05 505 | 9/1993 |
| DE | 43 07 175 | 9/1993 |
| DE | 42 34 228 | 4/1994 |
| DE | 43 06 528 | 9/1994 |
| DE | 43 10 845 | 10/1994 |
| DE | 197 26 782 | 1/1998 |
| WO | WO 97/06983 | 2/1997 |

* cited by examiner

Primary Examiner—Kenneth R. Rice
Assistant Examiner—Christopher Buchanan
(74) Attorney, Agent, or Firm—Foley & Lardner

(57) ABSTRACT

An airbag system comprising a bag which can be inflated with gas and a gas generator. At least one flexible guideway is firmly connected to the motor vehicle on one end and detachably connected to the motor vehicle on another. When the airbag is inactive, it is arranged on the end of the guideway which is firmly connected to the motor vehicle. Once the gas generator is ignited, the airbag can be displaced along the guideway in the direction of the detachable end using the gases entering the gas bag.

57 Claims, 12 Drawing Sheets

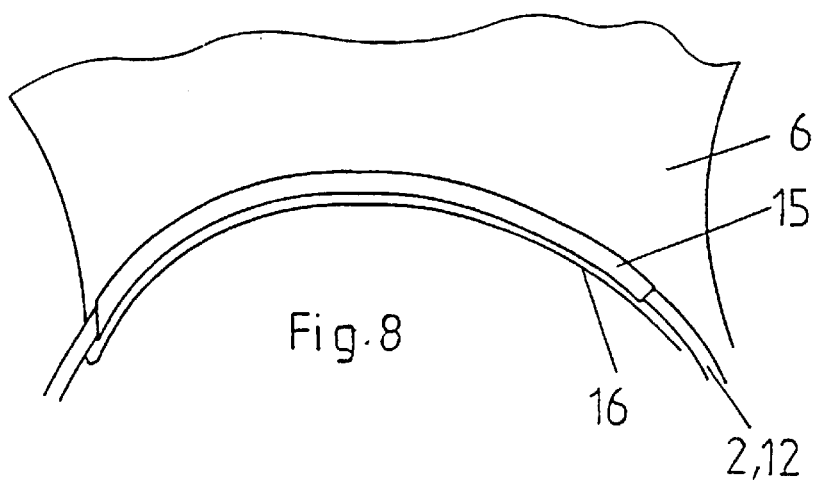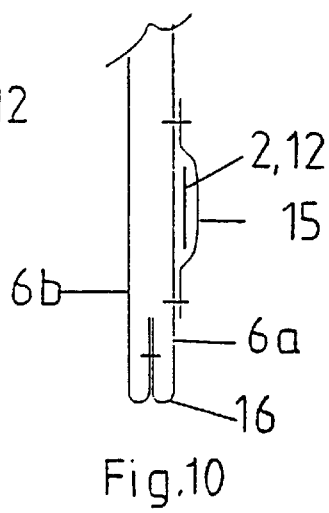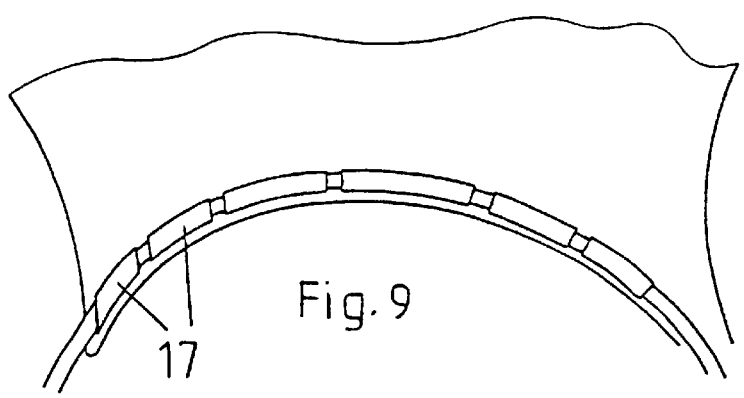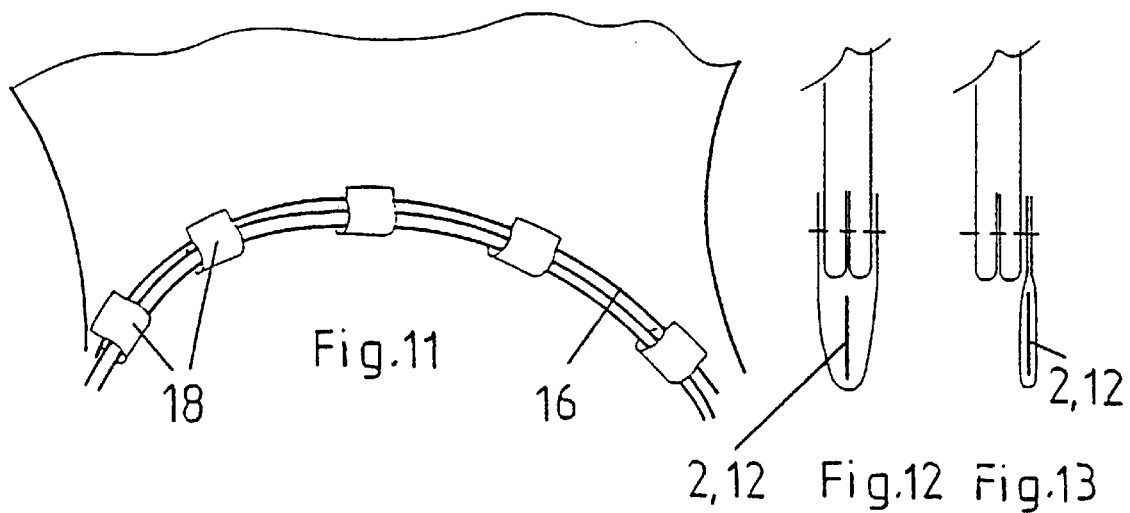

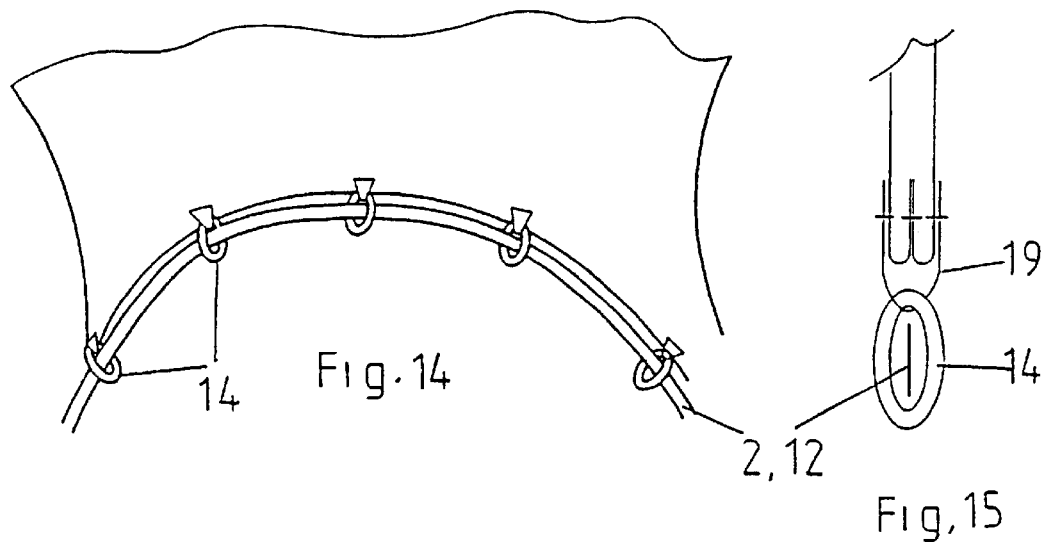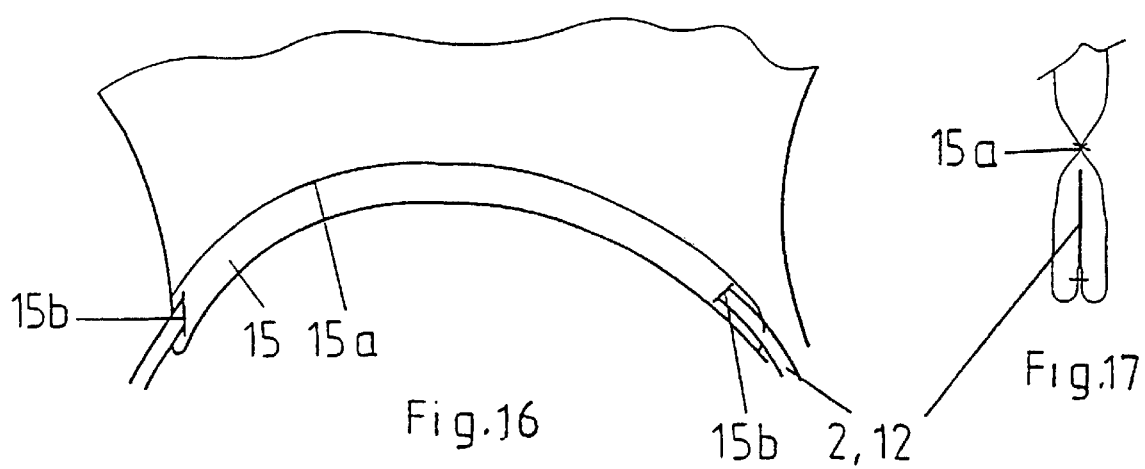

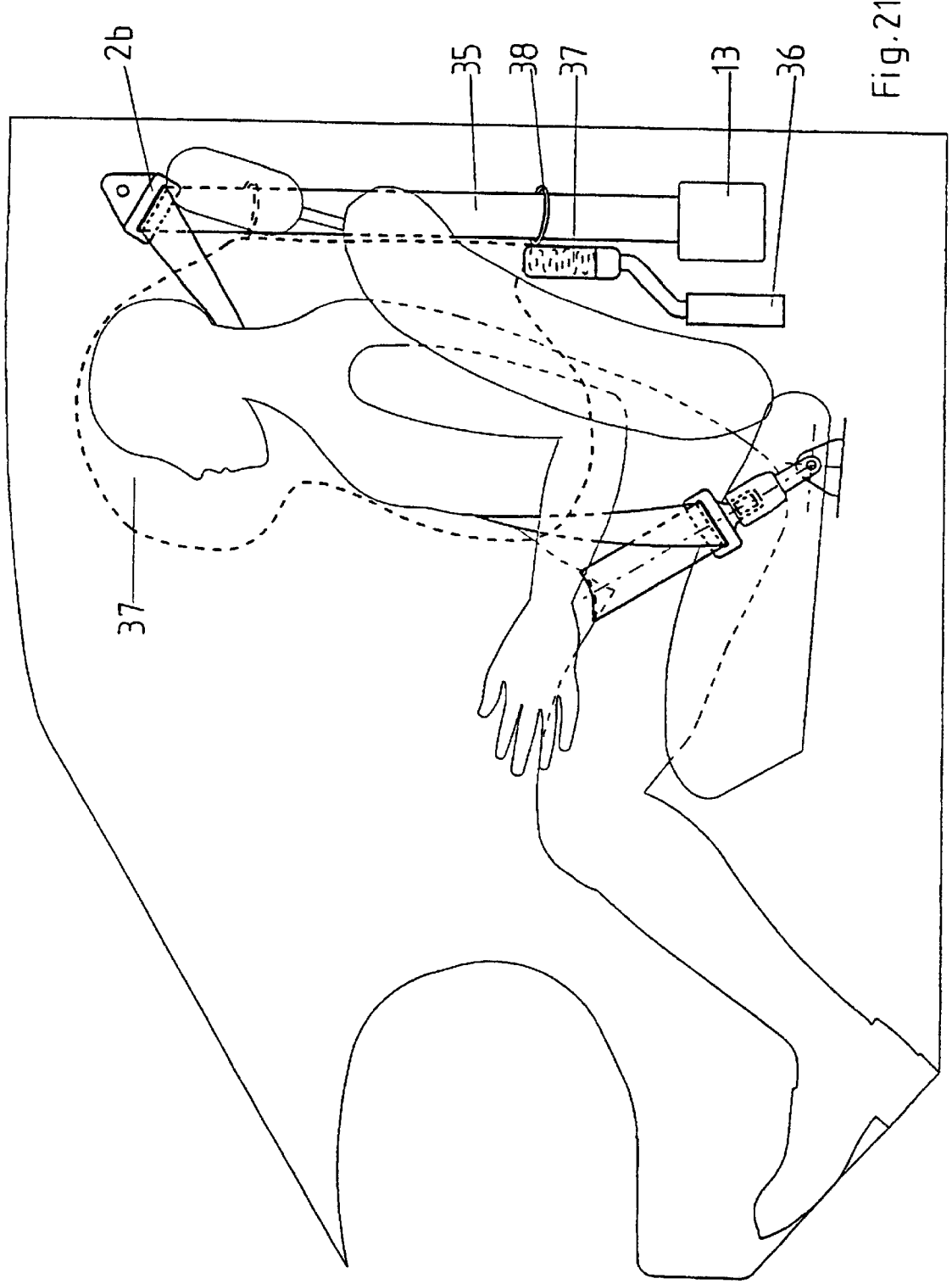

AIRBAG SYSTEM

BACKGROUND OF THE INVENTION

This invention relates to an airbag system.

Airbag restraint systems in the area of the pelvis or upper torso of the occupant are known. With these known systems, airbags are set in a belt or the seat belt is formed as an airbag.

Thus from German patent DE 43 06 528 A1, an airbag for seat belts is known wherein an airbag pocket is fitted on the existing belt and is connected to a compressed air line, as well as to a compressed air generator and release unit.

Furthermore an inflatable seat belt unit is known from German patent DE 42 32 041 A1 wherein at least one part of a section, which is in contact with an occupant in a vehicle, is formed in a bag-like form. The bag-like section thereby retains a belt-like shape in the inactivated state and in the event of a crash is inflated and unfolded by the gas. With this seat belt unit the seat belt is thus, itself, formed in sections as an airbag.

The advantage of these belt airbags is that as opposed to airbags which are stowed on the steering wheel or on parts of the vehicle bodywork located in front of the occupant, the belt airbags are placed directly against the occupant, i.e., they are already located in the area in which they are to exert their protective effect.

The drawback with these belt airbags however is that the airbag fabric is moved when putting the belt on and off so that it is exposed to changing stresses. The danger here is that the fabric wears away without the gas bag being unfolded.

The object of the invention is, therefore, to substantially avoid, in the case of an airbag system which can also be used in connection with a seat belt, the movement of the gas bag in the inactivated state.

SUMMARY OF THE INVENTION

With an airbag system having a gas bag and a gas generator according to the invention, at least one flexible guideway is provided which is connected fixedly at one end to the motor vehicle and detachably at the other end to the motor vehicle, wherein the gas bag in the inactivated state is mounted on the fixedly connected end of the guideway and wherein the gas bag after ignition of the gas generator can be moved along the guideway in the direction of the other detachable end under the influence of the gases entering into the gas bag.

The advantage of this airbag system is that the gas bag provided at the end of the flexible guideway connected fixed to the motor vehicle is not or is hardly moved during releasing and fixing of the other end of the guideway, and that the gas bag material is not exposed to any changing stresses. The gas bag is thereby located with this airbag system according to the invention in the inactivate state outside of the position required for protecting the occupant. Only after ignition of the gas generator is it brought into the position required to protect the occupant.

In one embodiment at least one guide element which is automatically guided on the guideway is provided on the gas bag. It is expedient if at least one shackle or ring is used as the guide element and where several guide elements are used these are arranged at a distance from each other. With this embodiment the guide elements engage around the guideway. The guide elements cause the gas bag to be automatically guided to the other end of the guideway after ignition of the gas generator.

It is expedient if the gas bag has a tubular gas inlet whose length is measured so that it is fully stretched in the fully unfolded state of the gas bag when the belt is fully extended and forms a slack when the belt is less extended. As a result of this different stretching of the gas inlet in dependence on the build of the occupant the gas bag is automatically centered on the guideway as it is unfolded independently of the extension length of the belt and thus of the guideway.

In a further development, it is proposed that the gas bag has a separate chamber running in the inflated state of the gas bag substantially parallel to the guideway and stretching from the gas generator side out over practically the entire width of the gas bag. It is thereby expedient if the chamber is divided by a rip seam or by a sewn-in intermediate wall from the remaining area of the gas bag. The gas bag is then first inflated in the separate chamber whereby the gas bag prior to full inflation is brought into the position required for protecting the occupant. The gas then enters into the remaining area of the gas bag through at least one port which is either already present or which is formed by tearing open and/or after the rip seams have torn open the gas enters over the entire width into the remaining area as a result of the gas bag interior which is now in one uniform piece.

The guideway can extend in the area of the occupant in different ways. Thus it can extend in front of the occupant from one seat side to the other whereby the gas generator is mounted at the side of the seat or behind same and wherein the gas bag is mounted in the inactivated state at the side of the seat and after ignition of the gas generator can be moved in the direction of the other side of the seat. With this arrangement a belt is preferably provided as the guideway which can be formed both as a seat belt lying taut against the occupant and as a belt lying loose against the occupant.

In a preferred embodiment, the section of a 3-point automatic belt mechanism running in the pelvic area is provided as the guideway.

In a further embodiment the belt or belt section running in the pelvic area is formed in two layers whereby only the second layer fixed on the first layer is provided as the guideway for the unfolding gas bag. The length of the guideway is dimensioned between its two connecting points on the first layer so that a predetermined distance can be set between the lap belt or lap belt section of a 3-point automatic belt mechanism closely adjoining the occupant, and the guideway during unfolding of the gas bag.

The twin-layered design can be used not only in the lap area but also in the shoulder area.

The belt can be placed like a standard seat belt and when not in use can hang by its detachable end from one side of the vehicle.

In one design it is proposed that the belt runs from the side on which the gas bag is mounted with the gas generator, out from a belt mechanism to the opposite side of the occupant where it is deflected and guided movable in a guide provided with a belt lock and then runs back to the other side to a belt mounting in the area of the gas generator.

In order to reliably prevent the relaxing gas bag from running back it is expedient if a non-return lock is provided on the gas bag to interact with the guideway. This has in one embodiment two cylindrical locking members mounted movable in a guide and set opposite one another on different sides of the guideway.

In a further embodiment it is proposed to use the airbag system according to the invention also for a side airbag. In this case the guideway extends at the side behind the occupant from the floor area to the head area. The gas generator and the inactivated gas bag are then mounted preferably in the floor area. The section of a 3-point automatic belt mechanism running between the belt automatic unit and the upper deflection is preferably provided as the guideway.

The airbag system can be used not only in passenger vehicles but also in all other types of motor vehicles.

BRIEF DESCRIPTION OF THE DRAWINGS

The invention will now be explained in further detail with reference to the embodiments shown in the drawings in which:

FIG. 8 is a partial view of a gas bag with a sewn-on continuous shackle;

FIG. 9 is a partial view of a gas bag with individual sewn-on shackles;

FIG. 10 is a sectional view through the gas bag according to FIGS. 8 and 9;

FIG. 11 shows a partial view of a gas bag with individual shackles sewn onto the lower edge;

FIG. 12 is a sectional view through the gas bag according to FIG. 11;

FIG. 13 is a sectional view through an embodiment with individual shackles sewn onto the lower edge on one side;

FIG. 14 is a partial view of a gas bag with rings as guide elements;

FIG. 15 is a sectional view through the gas bag according to FIG. 14;

FIG. 16 is a partial view of a gas bag with tucked-in continuous shackle;

FIG. 17 is a sectional view through the gas bag according to FIG. 16;

FIG. 21 shows a side view of a 3-point automatic belt with a side airbag.

DETAILED DESCRIPTION OF THE INVENTION

Figure 1:
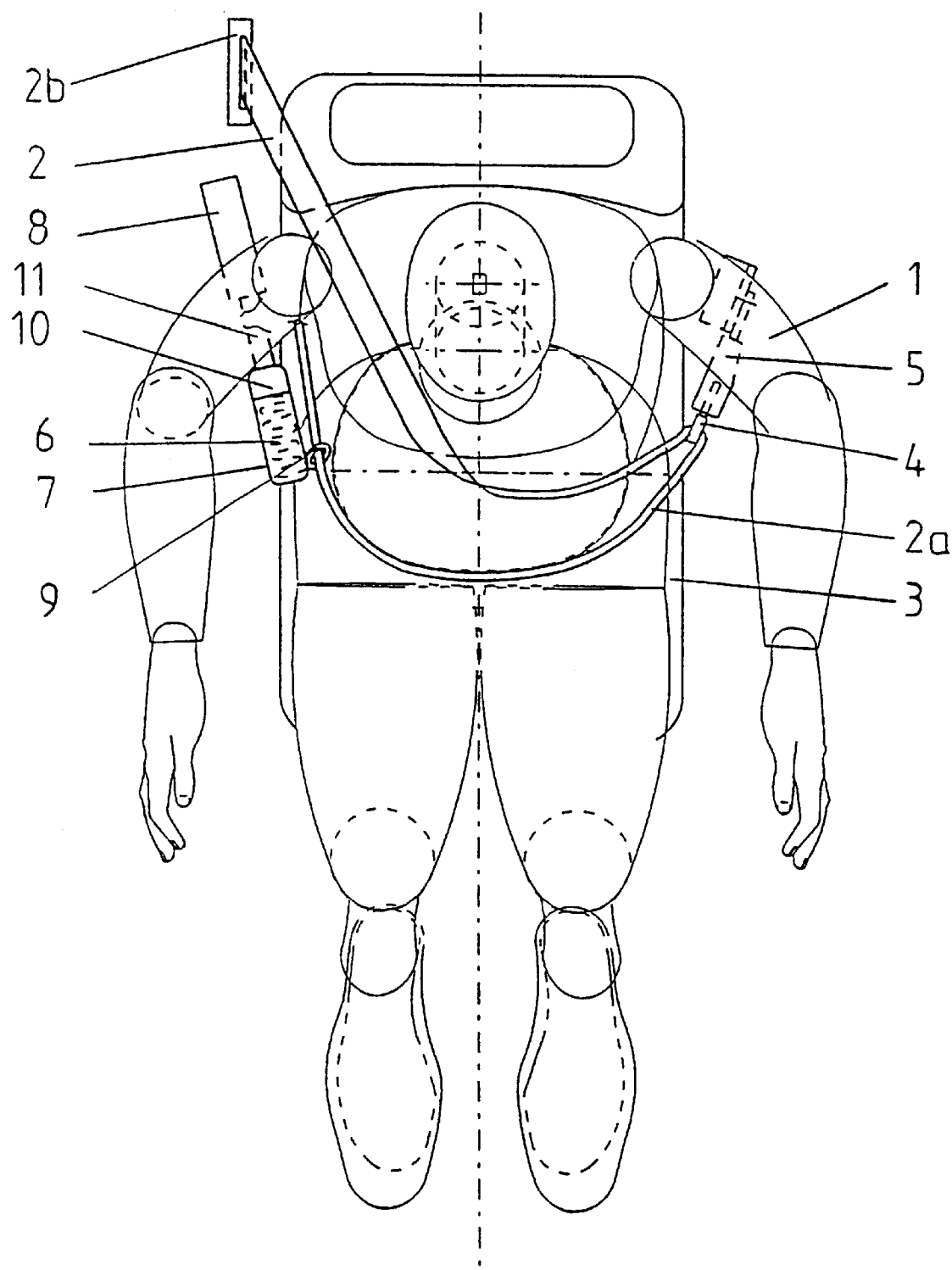
FIG. 1 shows a plan view of a guideway which is formed by the section of a 3-point automatic belt running in the lap area, with a ring as the guide element and an inactivated gas bag.
Figure 2:
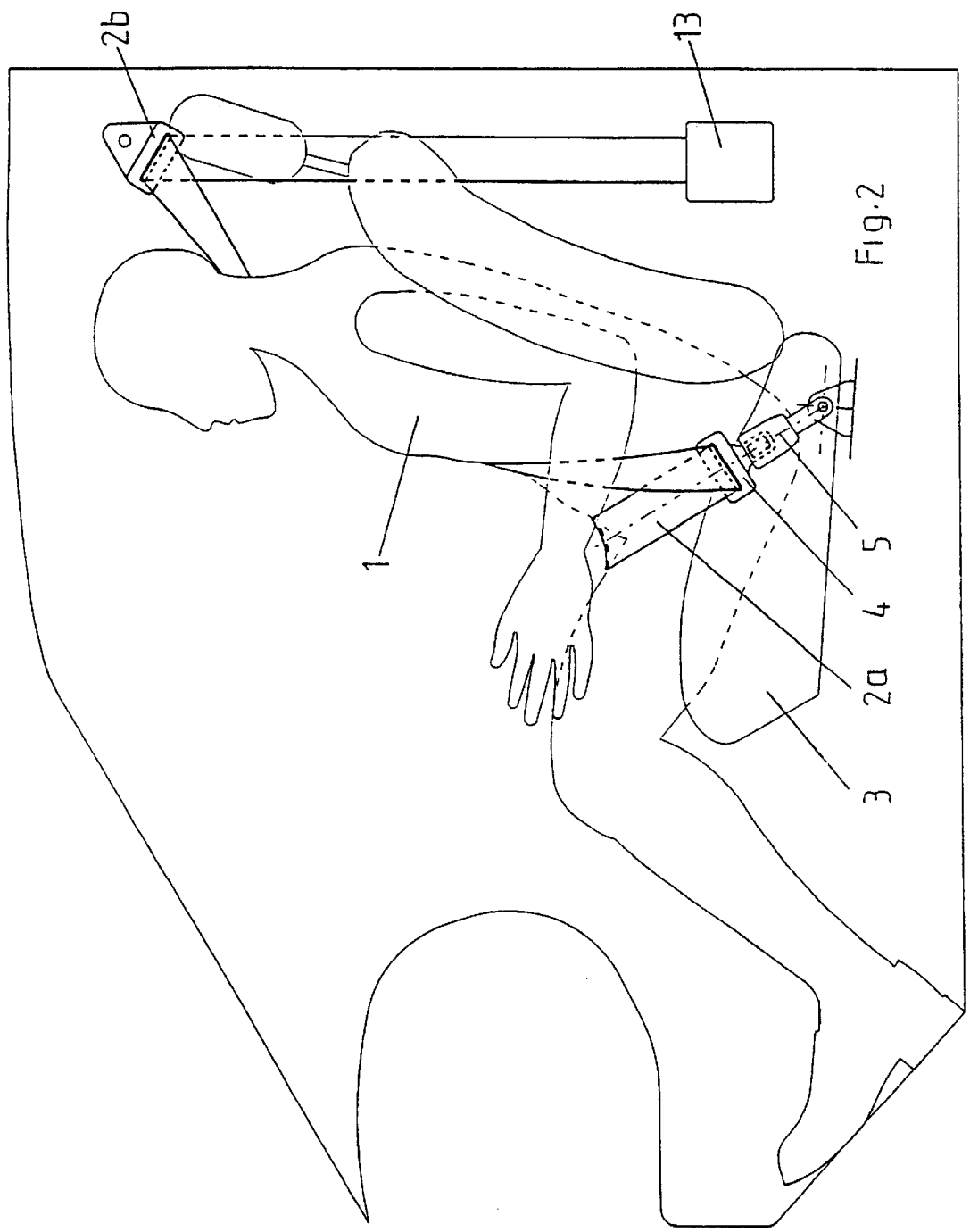
FIG. 2 shows the embodiment of FIG. 1 in side view.

In FIGS. 1 and 2, an occupant 1 is secured by a 3-point automatic belt 2. The belt section 2a running in the lap area runs as a guideway from one side of the seat 3 to the other. The automatic belt 2 is connected fixedly to the vehicle on the left-hand side in plan view and runs over the lap area to the opposite side. There it is deflected at a locking unit 4 and is guided over the shoulder of the occupant as well as over an upper deflection 2b to a automatic belt mechanism 13. The automatic belt is detachably connected to the motor vehicle in a belt lock 5 by means of the locking unit 4.

On the fixedly connected side of the belt 2, on the left in the drawing, a gas bag 6 is mounted in the folded state inside a tear-open cover 7 at the side of the occupant. The gas bag is connected by its rear end to the motor vehicle by means of a holder 10. A gas generator 8 is associated with the gas bag. The two are connected together by a supply pipe 11. A ring 9 is fixed to the front end of the gas bag and engages round the belt section 2a as a guideway. It can be seen that the gas bag does not have to move at all or only very little when the belt is taken off by the occupant so that the folded gas bag is not exposed to changing stresses.

Figure 3:
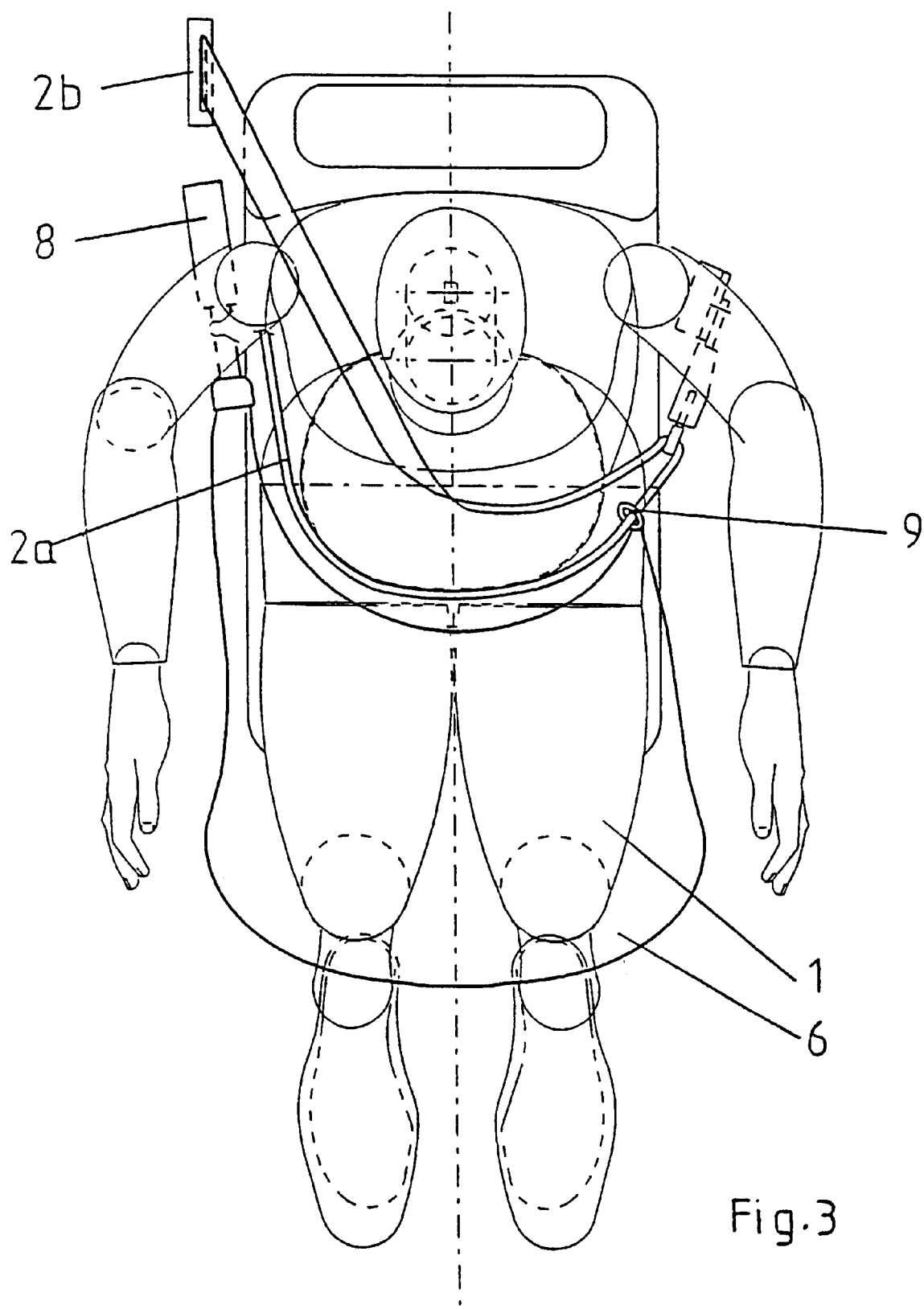
FIG. 3 shows a plan view of FIG. 1 with an unfolded gas bag.
Figure 4:
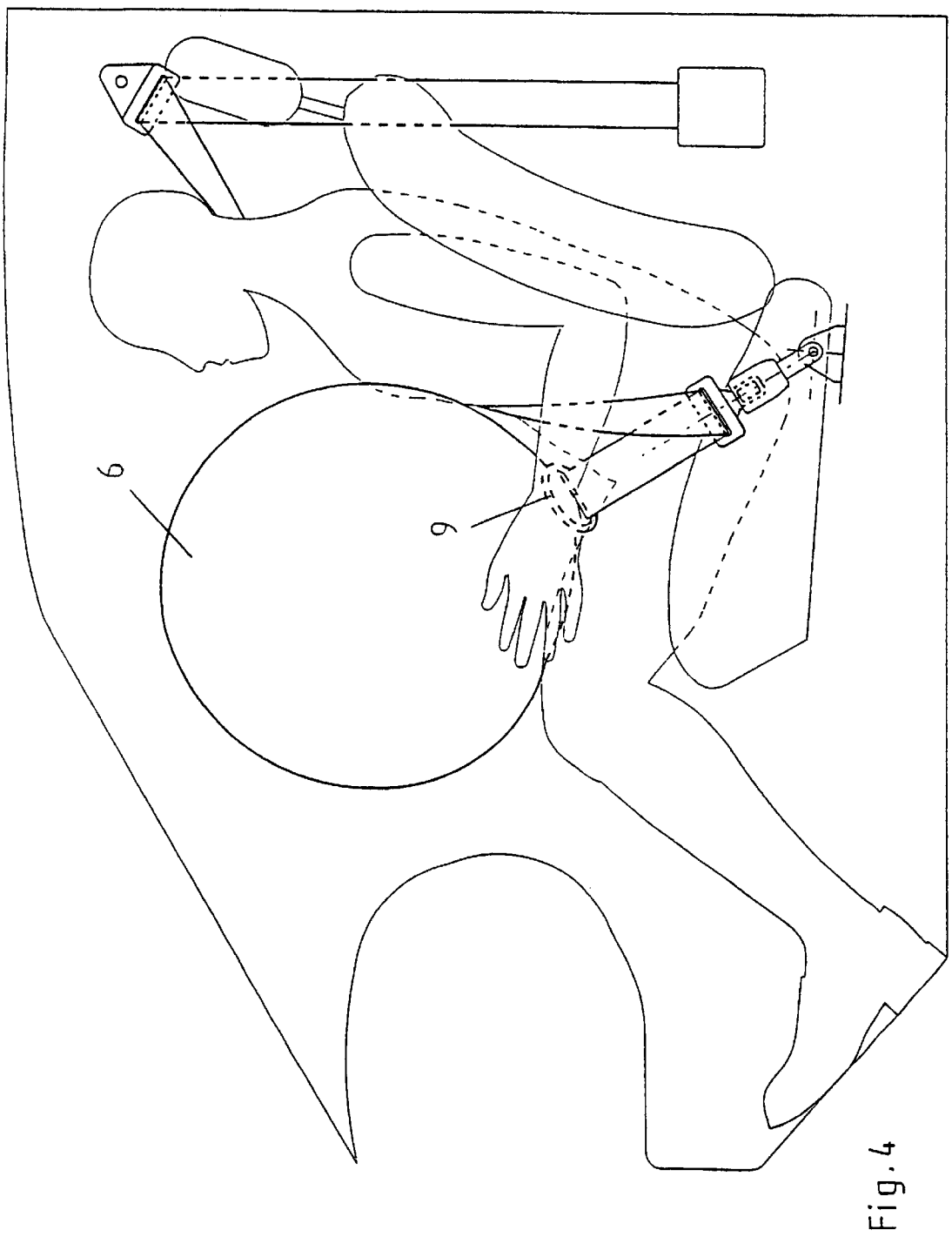
FIG. 4 shows a side view according to FIG. 2 with unfolded gas bag.

After ignition of the gas generator 8 the front end of the gas bag is moved with the ring 9 through the unfolding gas bag along the belt sections 2a as guideway from its rest position on one side of the seat to the other side of the seat so that the gas bag after complete unfolding as shown in FIGS. 3 and 4 is located in the position required to protect the occupant.

Figure 5:
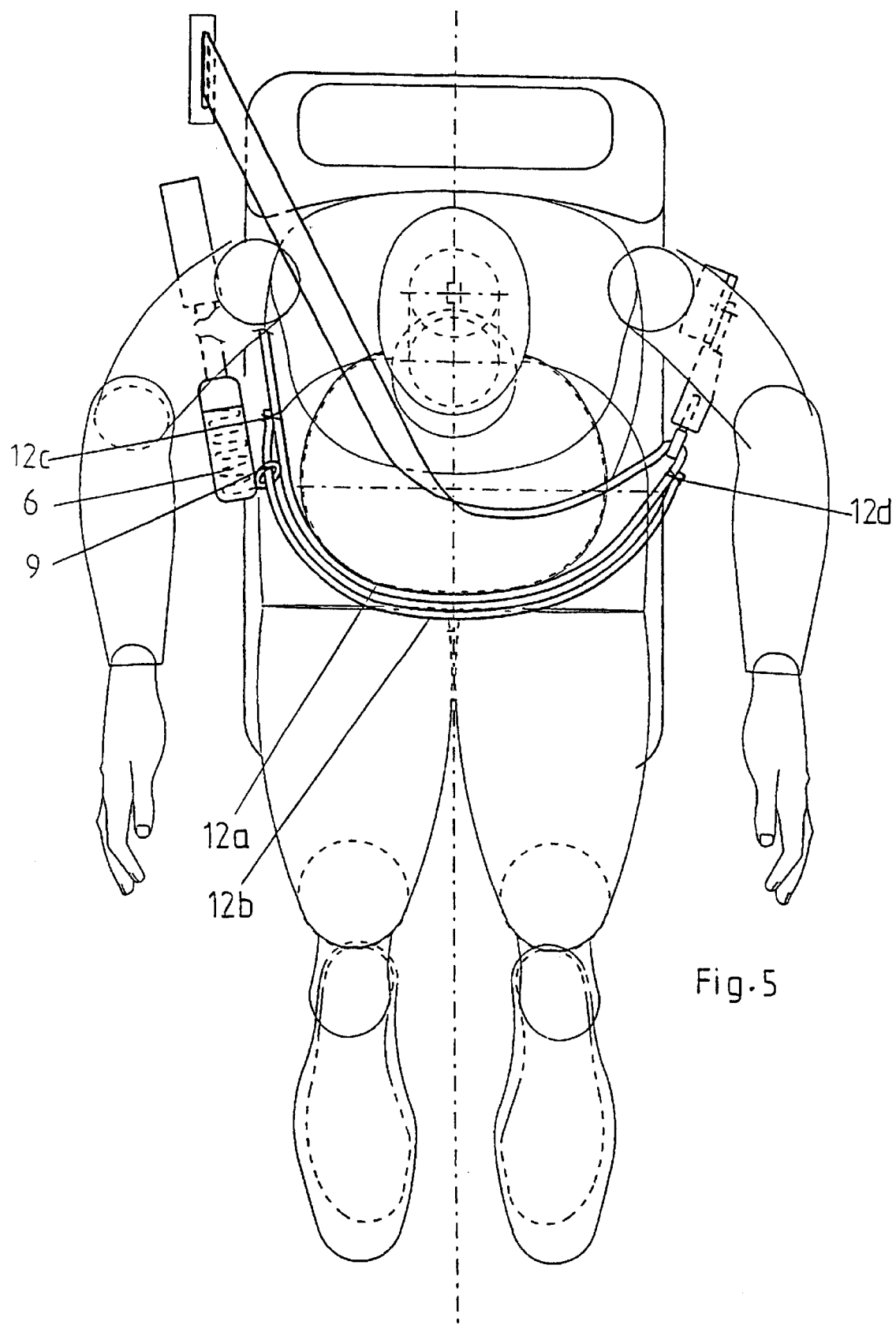
FIG. 5 shows a plan view of a 3-point automatic belt with twin-layered belt section in the lap area.

With the embodiment of FIG. 5, a 3-point automatic belt is provided wherein the belt section running in the lap area is designed in two layers. Thereby the first layer 12a represents a section of the 3-point automatic belt and the second layer 12b is a separate layer which is connected at binding points 12c, 12d to the layer 12a. It can be seen that an interspace is provided between the two layers so that the ring 9 can move particularly easily during unfolding of the gas bag.

Figure 6:
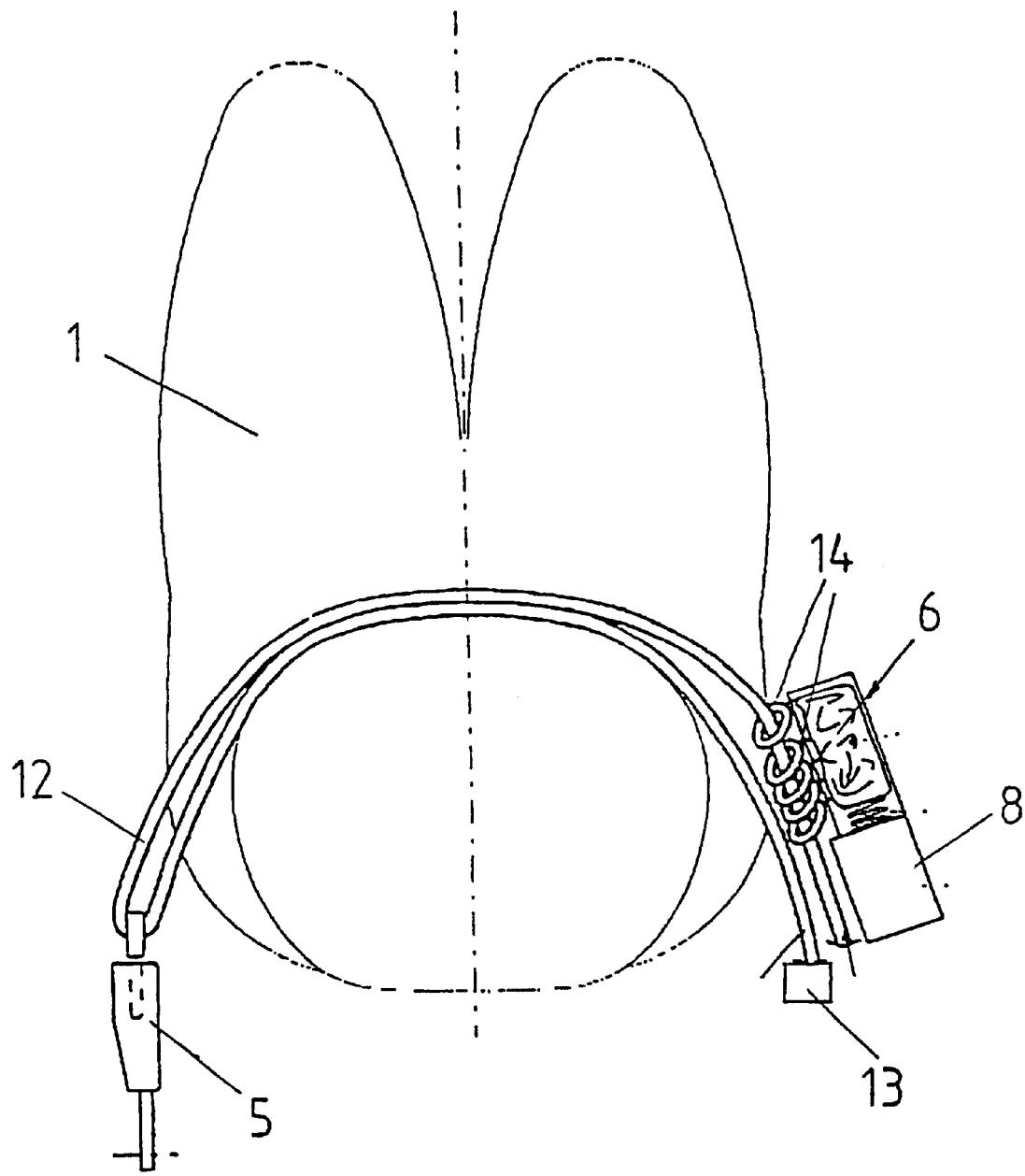
FIG. 6 is a plan view of a lap belt arrangement with several ring-shaped guide elements and inactivated gas bag.
Figure 7:
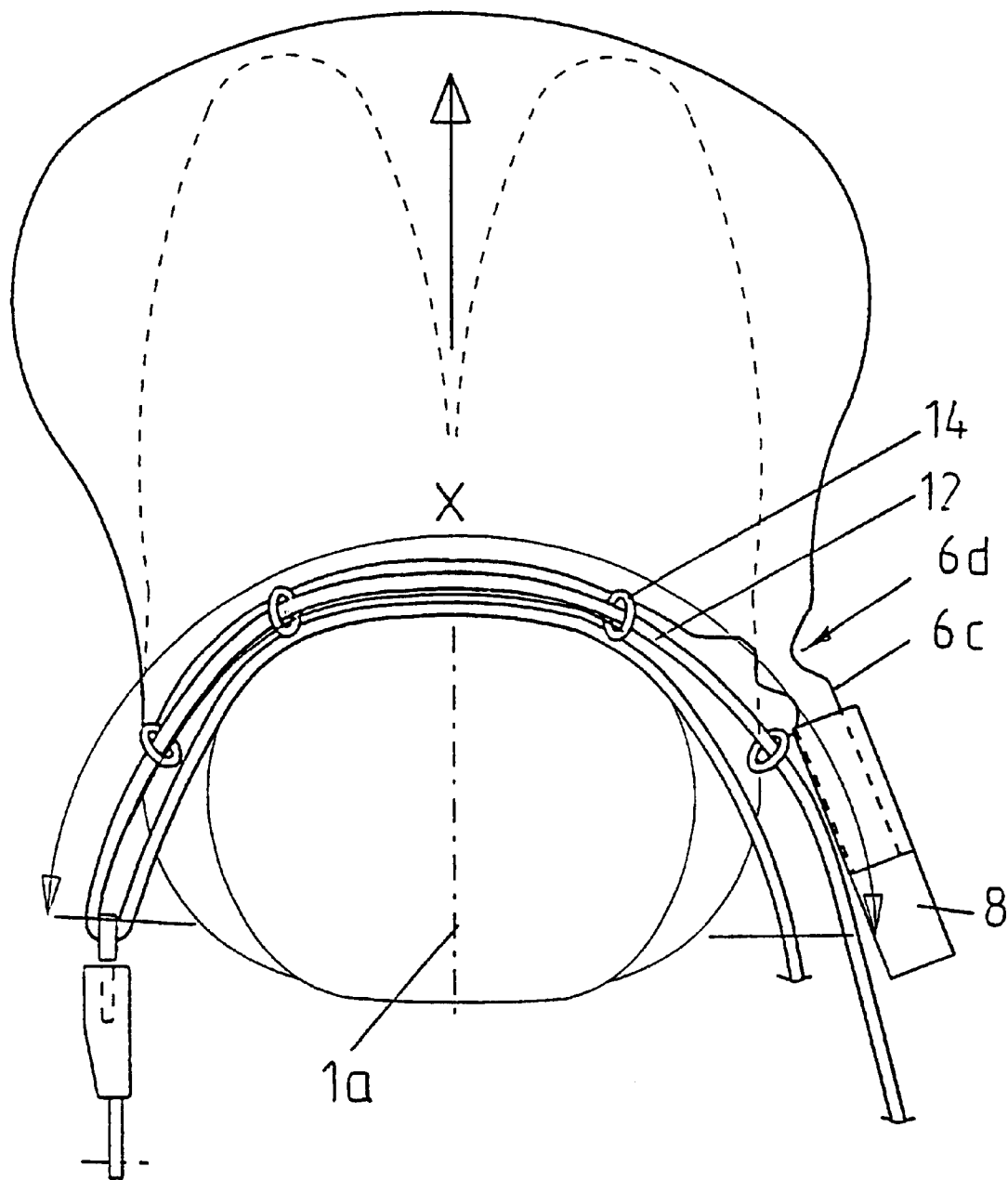
FIG. 7 is a plan view according to FIG. 6 with an unfolded gas bag.

With the embodiment in FIGS. 6 and 7 a two-layered belt 12 is provided. It runs starting from a automatic belt mechanism 13 from one side of the occupant to the other side. There it is deflected in the area of the belt lock 5 and returned to the other side of the occupant where it is fixed on the motor vehicle. This returning section of the belt 12 is enclosed by several rings 14 as guide elements which are fixed on same along an edge of the gas bag 6. The folded gas bag 6 is mounted with the associated gas generator 8 again at the side of the occupant.

After ignition of the gas generator the gas bag 6 is guided during unfolding by means of the rings 14 on the section of the belt 12 which serves as the guideway so that the gas bag is located after fully unfolding, as shown in FIG. 7, in the position required for protecting the occupant.

The extension length X of the guideway is dependent on the size and build of the occupant and on his clothing. The gas bag 6 has a tubular gas inlet 6c whose length is dimensioned so that in the fully unfolded state of the gas bag the inlet is fully stretched when the belt is at maximum extension. If the belt is less extended in the case of slimmer occupants, then the gas inlet 6c forms a slack 6d as shown in FIG. 7. As a result of this different stretching of the gas inlet 6c in dependence on the occupant, the gas bag, as it unfolds, is automatically centered on the guideway independently of the extension length X of the belt and thus of the guideway. The main unfolding direction marked by an arrow in FIG. 7 thereby coincides approximately with the center axis 1a of the occupant. Thereby the gas bag always occupies the optimum position for protecting the occupant.

In FIGS. 8 to 15 different types of guide elements are shown as well as their fitting on the gas bag. With the embodiment of FIG. 8, a continuous shackle 15 is provided which extends practically over the entire length of one edge 16 of the gas bag. As can be seen from FIG. 10, this shackle is stitched at the side on the gas bag 6 along this edge whereby the shackle can be stitched both on the side face 6*a*, as shown, and also on the side face 6*b* of the gas bag.

With the embodiment of FIG. 9, several individual shackles 17 are provided which are stitched like the continuous shackle 15 at the side on the gas bag, as shown in FIG. 10.

With the embodiment of FIG. 11 several individual shackles 18 are mounted underneath the edge 16 of the gas bag in the center (FIG. 12) or at the side (FIG. 13). The attachment shown in FIGS. 12 and 13 can also be used for a continuous shackle.

FIG. 14 shows again the embodiment already illustrated having rings 14 as guide elements while FIG. 15 shows the attachment of these rings to the gas bag by connecting shackles 19.

With the gas bag shown in FIGS. 16 and 17, a continuous shackle 15 is provided as the guide element which is achieved by a tuck 15*a* wherein the shackle is provided with slits 15*b* for passing through the guideway 2, 12.

Figure 18:
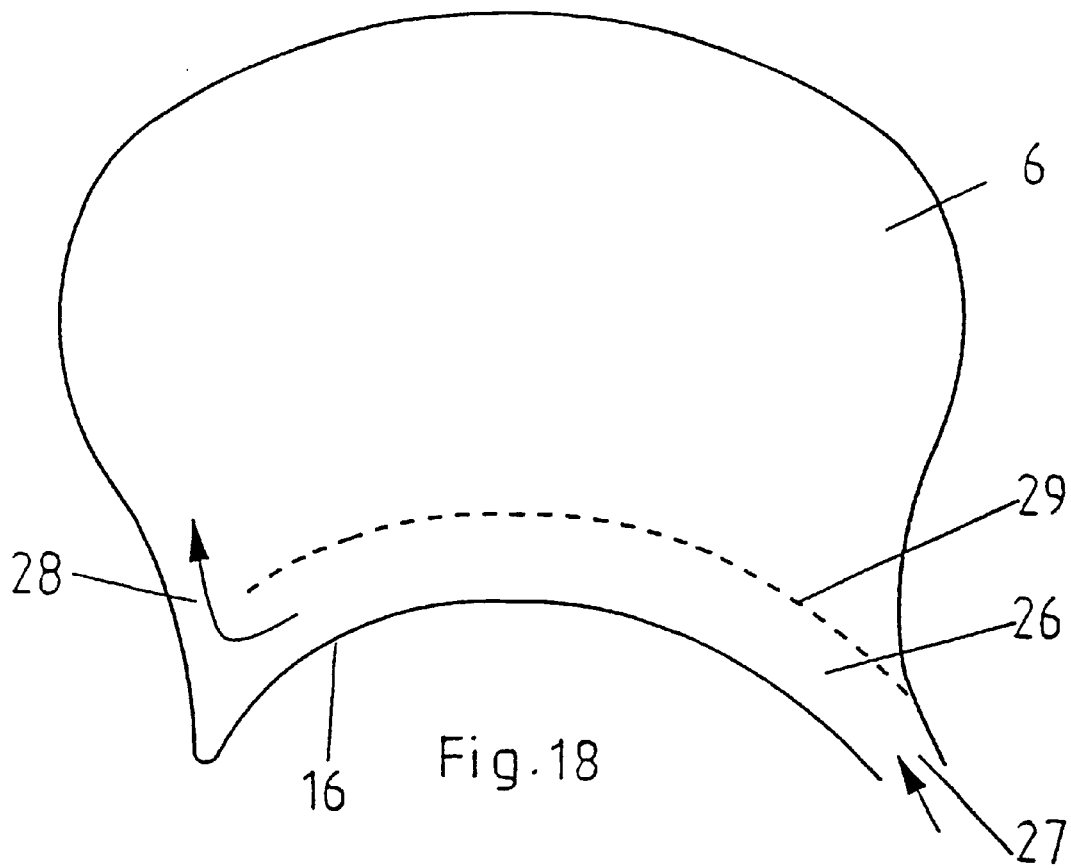
FIG. 18 is a plan view of a gas bag with a separate chamber.

With the gas bag shown in plan view in FIG. 18, a seam 29 runs through the gas bag 6 parallel to the edge 16 of the gas bag wherein the seam extends practically over the entire width of the gas bag 6. A chamber 26 is thereby provided. After ignition of the gas generator, the gas first passes through the gas inlet 27 only into this chamber of the gas bag whereby the gas bag is brought into its protecting position more quickly. The gas flows at the end of the chamber through a gas port 28 and into the remaining area of the gas bag. The seam 29 can thus be dimensioned so that it tears open from a certain pressure so that the gas can flow more quickly into the remaining area after positioning of the gas bag.

Figure 19:
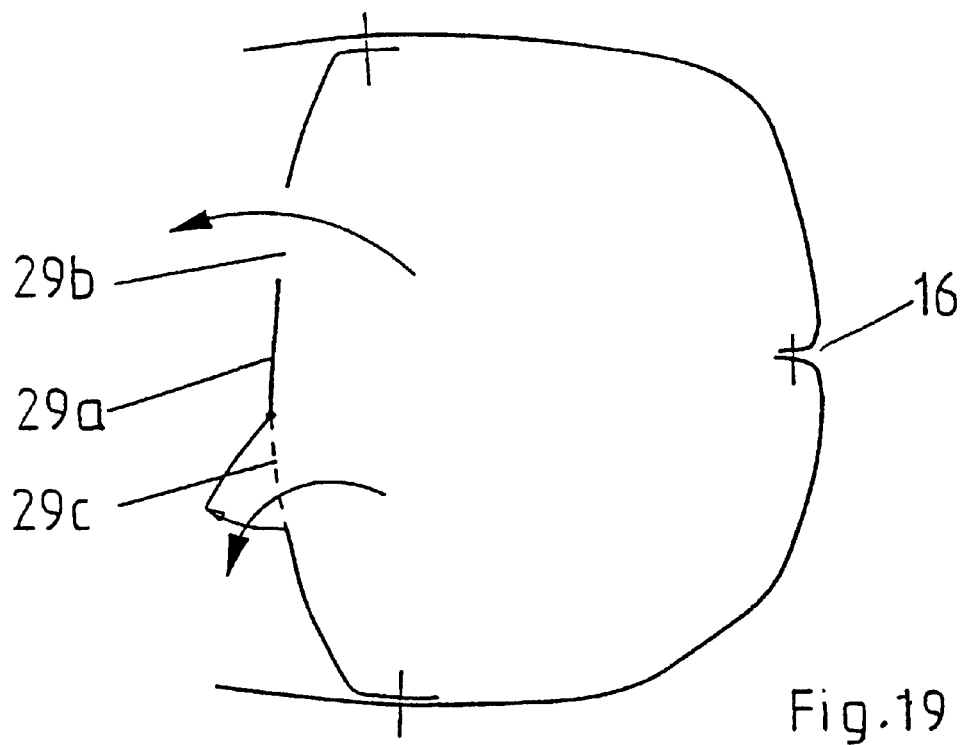
FIG. 19 is a sectional view through a further embodiment of the gas bag with a separate chamber.

FIG. 19 shows a further embodiment with a separate chamber. In this case the chamber is formed by an intermediate wall 29*a* sewn in approximately parallel to the edge 16 of the gas bag. The intermediate wall runs either practically or continuously over the entire width of the gas bag. Permanently open gas inlet orifices 29*b* or openings 29*c* which open only from a predetermined internal chamber pressure are provided in the intermediate wall 29*a*.

Figure 20:
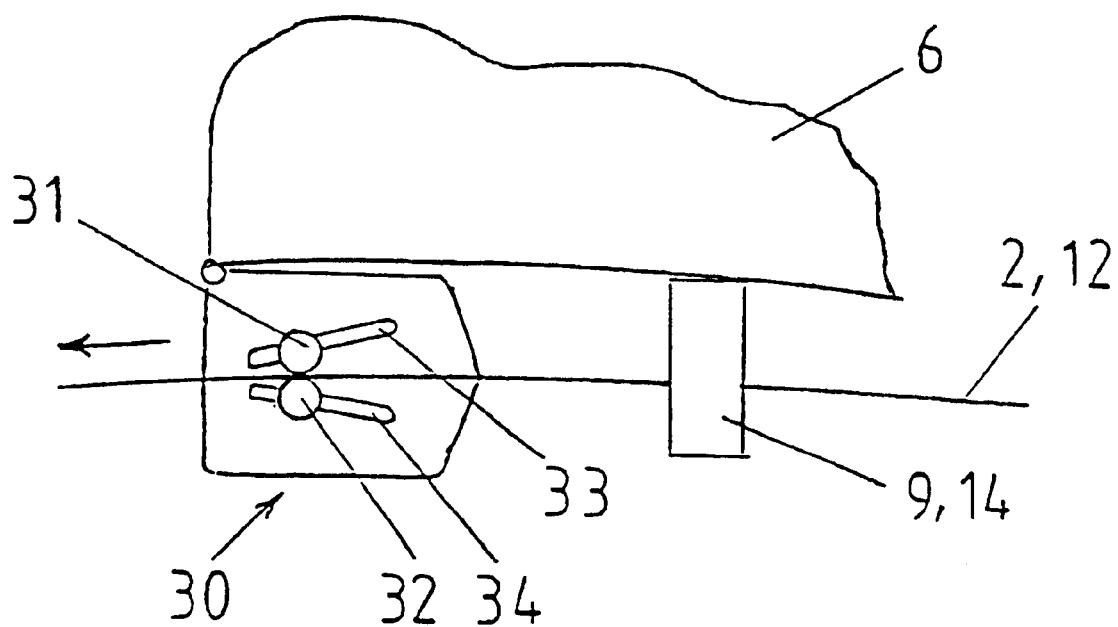
FIG. 20 shows a section from a gas bag with non-return lock.

FIG. 20 shows a non-return lock 30. This is fastened at the front end of the gas bag 6 which is guided in the manner described by means of the guide elements 9, 14, 17 or 18 on a belt 2 or 12. The belt runs through the non-return lock 30. This has either side of the belt cylindrical clamping members 31, 32 which are guided in slits 33, 34 running inclined relative to the belt. When the gas bag with the non-return lock is moved in the direction of the arrow as it unfolds, the clamping members are kept away from the belt owing to the inclined guide slits. When the gas bag is, however, to be moved in the opposite direction after unfolding, the clamping members are pressed against the belt as a result of the slits running towards each other, and thus prevent a return movement.

In the embodiments up until now the guideway ran in the lap area from one side of the occupant to the other side. The solution according to the invention can however be used equally well for a guideway in the shoulder area or for a side airbag. Thus FIG. 21 shows the use as a side airbag. The belt section 35 extending between the automatic belt mechanism 13 and the upper deflection 2*b* is used as the guideway. A gas generator 36 and the folded gas bag 37 with a ring 38 fixed thereon are mounted in the area of the automatic belt section 13. After ignition of the gas generator the gas bag is guided upwards on the ring 38 and after unfolding between the occupant and the side of the vehicle occupies the position shown in dotted lines.

What is claimed is:

1. An airbag system for protecting an occupant in a seat of a motor vehicle, comprising:
   a gas bag and a gas generator;
   a flexible guideway having a fixed end fixedly connectable to the motor vehicle and a detachable end detachably connectable to the motor vehicle,
   wherein the gas bag is mounted in an inactivated state on the fixed end of the guideway, and
   wherein the gas bag after ignition of the gas generator is moved along the guideway in the direction of the detachable end under the influence of the gases entering into the gas bag when the flexible guideway is attached to the motor vehicle.

2. An airbag system according to claim 1, further comprising a guide element on the gas bag, the guideway automatically guiding the guide element.

3. An airbag system according to claim 2, wherein the guide element comprises at least one shackle.

4. An airbag system according to claim 1, further comprising a plurality of guide elements mounted on the gas bag at spaced intervals, the guideway automatically guiding the guide elements.

5. An airbag system according to claim 1, wherein the gas bag has a tubular gas inlet whose length is dimensioned so that in the fully unfolded state of the gas bag, the gas inlet fully extends when the guideway is at a maximum extension and forms a slack when the guideway is at less then the maximum extension.

6. An airbag system according to claim 1, wherein the gas bag has a separate chamber extending substantially the width of the gas bag from a side of the gas generator, the separate chamber extending substantially parallel to the guideway when the gas bag is inflated.

7. An airbag system according to claim 6, wherein the chamber is separated from the remaining area of the gas bag with a rip seam or a sewn-in intermediate wall.

8. An airbag system according to claim 1, wherein the guideway comprises a belt.

9. An airbag system according to claim 8, wherein the belt is a lap belt.

10. An airbag system according to claim 8, wherein the guideway comprises a section of a 3-point automatic belt.

11. An airbag system according to claim 8, wherein the belt has a first layer and a second layer, the guideway comprising the second layer of the belt.

12. An airbag system according to claim 1, further comprising a non-return lock on the gas bag and interacting with the guideway.

13. An airbag system according to claim 12, wherein the non-return lock has two cylindrical clamping members movably mounted in respective guides and set opposite one another on different sides of the guideway.

14. An airbag system according to claim 2, wherein the guide element comprising a ring.

15. A motor vehicle having an airbag system for protecting an occupant in a motor vehicle, comprising:
   a seat having a first side and a second side;
   a gas bag and a gas generator; and
   a flexible guideway having a fixed end fixedly connected to the motor vehicle and a detachable end detachably connectable to the motor vehicle,
   wherein the gas bag is mounted in an inactivated state on the fixed end of the guideway, and wherein the gas bag after ignition of the gas generator is moved along the guideway in the direction of the detachable end under the influence of the gases entering into the gas bag when the detachable end is connected to the motor vehicle.

16. A motor vehicle according to claim 15, wherein the guideway extends from the first side of the seat to the second side, wherein the gas generator is mounted adjacent to the first side of the seat and the gas bag is mounted in the inactivated state adjacent to the first side of the seat, and after ignition of the gas generator, the gas bag is moved in the direction of the second side of the seat.

17. A motor vehicle according to claim 15, wherein the guideway extends from the first side of the seat to the second side, wherein the gas generator is mounted behind the seat and that the gas bag is mounted in the inactivated state adjacent to the first side of the seat, and after ignition of the gas generator, the gas bag is moved in the direction of the second side of the seat.

18. A motor vehicle according to claim 15, wherein the guideway comprises a belt adjoining taut against the occupant when the occupant is seated in the seat with the detachable end of the guideway connected to the motor vehicle.

19. A motor vehicle according to claim 15, wherein the guideway comprises a belt adjoining loose against the occupant when the occupant is seated in the seat with the detachable end of the guideway connected to the motor vehicle.

20. A motor vehicle according to claim 15, further comprising:
   a guide provided with a belt lock; and
   a belt fastening in the area of the gas generator,
   wherein the guideway comprises a belt extendable from the first side on which the gas bag is provided with the gas generator to the second side of the seat.

21. A motor vehicle according to claim 15, wherein the motor vehicle comprises a head area and a floor area, and wherein the guideway extends at a side behind the occupant from the floor area to the head area.

22. A motor vehicle according to claim 21, wherein the gas generator and the inactivated gas bag are mounted in the floor area.

23. A motor vehicle according to claim 21, further including an upper deflection, wherein the guideway comprises a section of a 3-point automatic belt.

24. An airbag arrangement for protecting an occupant in a seat of a motor vehicle, comprising:
   a gas bag and a gas generator;
   a flexible guideway configured to extend along one side of the occupant between a floor area of the vehicle a head area of the occupant,
   wherein the gas bag is mounted in an inactivated state on the floor area of the guideway, and
   wherein the gas bag is moved upwardly along the guideway under the influence of the gases entering into the gas bag when the gas generator is ignited.

25. An airbag arrangement according to claim 23, wherein the guideway extends at a side behind the occupant from the floor area to the head area.

26. An airbag arrangement according to claim 25, wherein the gas generator is configured to be mounted to the floor area.

27. An airbag arrangement according to claim 26, wherein the guideway comprises a vertical section of a 3-point automatic belt.

28. An airbag arrangement for an occupant seated in a seat of a motor vehicle, comprising:
   a seatbelt secured to the vehicle and having a belt section that extends along one side of the occupant seated in the vehicle;
   a gas generator and a gas bag holder mounted to the vehicle adjacent to the belt section;
   a gas bag attached to the holder so that the gas generator supplies gas to the gas bag to inflate the gas bag along the belt section; and
   a seat belt guide secured to the gas bag and slidably movable along the belt section,
   wherein when the gas bag is in an inactivated state, the guide remains stationary, substantially undisturbed next to the holder, and when the gas bag is inflated, the guide slides along the belt section to guide the expanding gas bag along the belt section.

29. An airbag arrangement according to claim 28, wherein the guide comprises at least one shackle.

30. An airbag arrangement according to claim 28, wherein the guide comprises at least one ring.

31. An airbag arrangement according to claim 28, wherein the guide comprises a plurality of rings mounted on the gas bag at spaced intervals.

32. An airbag arrangement according to claim 28, wherein the guide comprises a plurality of shackles mounted on the gas bag at spaced intervals.

33. An airbag arrangement according to claim 28, wherein the gas bag has a tubular gas inlet dimensioned so that when the gas bag is fully inflated and the seatbelt is at a maximum extension, the tubular gas inlet becomes fully extended, and forms a slack when the seatbelt is less than at the maximum extension.

34. An airbag arrangement according to claim 28, wherein the gas bag has a separate chamber that extends substantially parallel to the belt section, substantially over the entire width of the gas bag.

35. An airbag arrangement according to claim 34, wherein the chamber is divided from the remaining area of the gas bag with one of a rip seam and a sewn-in intermediate wall.

36. An airbag arrangement according to claim 28, wherein the belt section comprises one of a lap belt portion and a substantially vertical belt portion extending substantially vertically alongside the seat.

37. An airbag arrangement according to claim 36, wherein the seatbelt comprises a 3-point automatic seatbelt.

38. An airbag arrangement according to claim 37, wherein the belt section comprises the lap belt portion, and the guide is movable from a first side to a second side of the seat along the lap belt portion, wherein the gas generator and the holder are mounted along the first side of the seat so that the gas bag expands from the first side to the second side when the gas bag is inflated.

39. An airbag arrangement according to claim 37, wherein the belt section comprises the substantially vertical belt portion, and the guide is movable substantially vertically along one side of the seat along the vertical belt portion, wherein the gas generator and the holder are mounted behind the seat so that the gas bag expands upwardly along the side of the seat when the gas bag is inflated.

40. An airbag arrangement according to claim 37, wherein the belt section comprises the lap belt portion having a first layer and a second layer, wherein the guide is movable along the second layer.

41. An airbag arrangement according to claim 28, further including a non-return lock on the gas bag for locking against the belt section.

42. An airbag arrangement according to claim 41, wherein the non-return lock has two cylindrical clamping members movably mounted on respective guides and set opposite one another on different sides of the belt section.

43. A motor vehicle having an airbag system for protecting an occupant seated in a seat thereof, the airbag system comprising:
- a seatbelt secured to the vehicle alongside the seat and having a belt section that extend along one side of the occupant seated in the seat;
- a gas generator and a gas bag holder mounted to the vehicle next to the seat;
- a gas bag attached to the holder so that the gas generator supplies gas to the gas bag to inflate the gas bag along the belt section; and
- a seat belt guide secured to the gas bag and slidably movable along the belt section,
- wherein when the gas bag is in an inactivated state, the guide remains stationary, substantially undisturbed next to the holder, and when the gas bag is inflated, the guide slides along the belt section to guide the expanding gas bag along the belt section.

44. A motor vehicle according to claim 43, wherein the belt section comprises one of a lap belt portion and a substantially vertical belt portion extending substantially vertically alongside the seat.

45. A motor vehicle according to claim 44, wherein the belt section comprises the lap belt portion, and the guide is movable from a first side to a second side of the seat along the lap belt portion, wherein the gas generator and the holder are mounted along the first side of the seat so that the gas bag expands from the first side to the second side when the gas bag is inflated.

46. A motor vehicle according to claim 44, wherein the belt section comprises the substantially vertical belt portion, and the guide is movable substantially vertically along one side of the seat along the vertical belt portion, wherein the gas generator and the holder are mounted behind the occupant so that the gas bag expands upwardly along the side of the seat when the gas bag is inflated.

47. A motor vehicle according to claim 43, wherein the motor vehicle has a head area and a floor area, and wherein the gas bag extends at a side behind the occupant from the floor area to the head area when the gas bag is inflated.

48. A motor vehicle according to claim 47, wherein the gas generator and the holder are mounted to the floor area.

49. A motor vehicle according to claim 43, further including an upper deflection, wherein the seatbelt comprises a 3-point automatic belt, a portion of which extends between the airbag and the upper deflection.

50. A motor vehicle according to claim 43, wherein the guide comprises at least one shackle.

51. A motor vehicle according to claim 43, wherein the guide comprises at least one ring.

52. A motor vehicle according to claim 43, wherein the guide comprises one of a plurality of rings and a plurality of shackles mounted on the gas bag at a spaced interval.

53. A motor vehicle according to claim 43, wherein the gas bag has a tubular gas inlet dimensioned so that when the gas bag is fully inflated and the seatbelt is at a maximum extension, the tubular gas inlet is fully extended, and forms a slack when the seatbelt is less than at the maximum extension.

54. A motor vehicle according to claim 43, wherein the gas bag has a separate chamber that extends substantially parallel to the belt section, substantially over the entire width of the gas bag.

55. A motor vehicle according to claim 54, wherein the chamber is divided from the remaining area of the gas bag with one of a rip seam and a sewn-in intermediate wall.

56. A motor vehicle according to claim 43, further including a non-return lock on the gas bag for locking against the belt section.

57. A motor vehicle according to claim 56, wherein the non-return lock has two cylindrical clamping members movably mounted on respective guides and set opposite one another on different sides of the belt section.

* * * * *